United States Patent
Lafay et al.

(10) Patent No.: US 11,780,782 B2
(45) Date of Patent: Oct. 10, 2023

(54) PRODUCTION OF FOUNDRY PREMIX COMPOSITION

(71) Applicant: IMERYS USA, INC., Roswell, GA (US)

(72) Inventors: Vic Lafay, Cincinnati, OH (US); Brian Burns, Lebanon, OH (US)

(73) Assignee: IMERYS USA, INC., Roswell, GA (US)

( * ) Notice: Subject to any disclaimer, the term of this patent is extended or adjusted under 35 U.S.C. 154(b) by 362 days.

(21) Appl. No.: 17/280,703

(22) PCT Filed: Sep. 27, 2019

(86) PCT No.: PCT/US2019/053386
§ 371 (c)(1),
(2) Date: Mar. 26, 2021

(87) PCT Pub. No.: WO2020/069272
PCT Pub. Date: Apr. 2, 2020

(65) Prior Publication Data
US 2022/0041517 A1  Feb. 10, 2022

Related U.S. Application Data

(60) Provisional application No. 62/738,273, filed on Sep. 28, 2018.

(51) Int. Cl.
*B22C 1/02* (2006.01)
*B22C 1/18* (2006.01)
(Continued)

(52) U.S. Cl.
CPC ............ *C04B 40/0042* (2013.01); *B22C 1/02* (2013.01); *B22C 1/181* (2013.01); *B22C 9/02* (2013.01);
(Continued)

(58) Field of Classification Search
CPC .................................. B22C 1/02; B22C 1/181
See application file for complete search history.

(56) References Cited

U.S. PATENT DOCUMENTS

| 3,966,174 A | 6/1976 | Deve |
| 2003/0047840 A1 | 3/2003 | Kelly |
| 2012/0325113 A1 | 12/2012 | LaFay et al. |

FOREIGN PATENT DOCUMENTS

| DE | 102007027621 A1 * | 12/2008 | ............... B22C 1/02 |
| EP | 0549547 A1 * | 6/1993 | ............... B22C 1/02 |
| WO | WO-9928064 A1 * | 6/1999 | ............... B22C 1/02 |

OTHER PUBLICATIONS

International Search Report dated Dec. 11, 2019, in International Application No. PCT/US2019/053386.

* cited by examiner

*Primary Examiner* — Kevin E Yoon
(74) *Attorney, Agent, or Firm* — FINNEGAN, HENDERSON, FARABOW, GARRETT & DUNNER LLP

(57) ABSTRACT

A method of preparing a unique foundry premix composition that has a low bulk density of 30-45 lbs/ft$^3$ and contains fine particles with an average particle size of 85-100 μm is described. The unique foundry premix composition is produced by using specially designed assemblies of mechanical equipment with improved efficiency so that the premix can be prepared at a site closer to a foundry. As a result, increase in premix density caused by handling and shipping across a long distance from a traditional premix manufacturing facility to a foundry can be suppressed; transportation cost can be saved; and safety would be of less concern. The use of the foundry premix composition to prepare a sand molding medium for casting molded articles is also described.

19 Claims, 2 Drawing Sheets

(51) Int. Cl.
  *C04B 40/00* (2006.01)
  *B22C 9/02* (2006.01)
  *C04B 14/02* (2006.01)
  *C04B 14/10* (2006.01)
  *C04B 28/00* (2006.01)
  *C04B 111/00* (2006.01)
(52) U.S. Cl.
  CPC .......... *C04B 14/022* (2013.01); *C04B 14/104* (2013.01); *C04B 28/001* (2013.01); *C04B 2111/0087* (2013.01)

PRODUCTION OF FOUNDRY PREMIX COMPOSITION

CLAIM FOR PRIORITY

This application is a U.S. national phase entry under 35 U.S.C. § 371 of PCT International Application No. PCT/US2019/053386, filed Sep. 27, 2019, which claims the benefit of priority to U.S. Provisional Application No. 62/738,273, filed Sep. 28, 2018. The disclosures of the above-referenced applications are expressly incorporated herein by reference in their entireties.

TECHNICAL FIELD

This disclosure relates generally to the preparation of a foundry premix composition with a small average particle size, a narrow size distribution, and a low bulk density. This disclosure also relates to the use of the premix composition thus prepared for sand cast molding.

BACKGROUND

Casting is a foundry process for preparing articles in which a heated liquid material, often a metal or metal alloy, is poured into the cavity of a mold and allowed to cool in the shape of the cavity. The casted article is then released from the mold. Depending on the nature of the material to be cast, various materials can be used to form the mold. Sand casting, for example, is useful for casting metals and metal alloys. In this process, sand is typically mixed with a binding agent (such as a mixture of clay and water) and other additives to form a sand molding medium, which is then formed into the desired mold shape. Sand molding media for iron founding comprise three basic components, namely, sand, clay, and finely ground bituminous coal, commonly known in the trade as "sea coal." Forming a sand mold can be done by compacting the sand molding medium around a pattern (e.g., a replica of the article to be cast) and removing the pattern to leave a cavity with the desired shape and configuration. Once molten metal is introduced into the mold and cooled to solidify, the casted metal article may be released, often by breaking down the sand mold.

One method of sand casting is called "green sand casting," which refers to the use of wet or moistened sand to form the mold. A green sand molding medium typically comprises by weight, from about 86% to 90% sand and non-sand components, including 8% to 10% inorganic binding agent such as bentonite clay, 2% to 4% organic additives, and 2% to 4% moisture. The binding agent allows the sand particles to cohere such that the mold can maintain its shape and withstand stress applied throughout the casting process. During green sand casting, the sand mold retains some amount of moisture which enables to maintain the cohesive properties of the clay at both ambient and elevated temperatures. After removal of the pattern, molten metal is poured into the mold cavity while the sand molding medium is still in its dampened or "green" condition. The sea coal on and immediately adjacent the mold cavity surface decomposes under the heat of the molten metal as it is poured into the mold. A product of this decomposition is elemental carbon, in the form of graphite, at the interface between the mold cavity and the poured molten metal. This elemental graphite serves the primary function of enabling the solidified casting to be released from the mold and free of sand particles and the secondary benefit of leveling the surface of the mold cavity so that the cast article has a smoother surface.

A composition that includes a clay component and a carbon component is typically known as a foundry premix composition. The premix composition can then be mixed with sand from a local source to produce the sand molding medium used in sand casting.

Preparing foundry premix composition has been completed for many years in the foundry industry using traditional facilities, which include a blending facility that has encompasses a building with a series of storage silos, possible grinding facilities that are used to grind, and a centrally located blending device to blend the materials. The finished product is then transported and sold in packages. A traditional foundry premix composition typically has a particle size of 100 to 120 μm and a bulk density of 45 to 60 lbs/ft$^3$ so that the premix can be conveniently and safely stored and transported. However, a less dense premix with finer particles has improved performance for the foundry industry. Therefore, how to prepare such a premix composition without transportation and safety concerns remains unsolved.

In the present disclosure, a method of preparing a unique foundry premix composition containing fine particles and having low bulk density is described. The method utilizes various assemblies of mechanical equipment designs that have improved efficiency to alter the size distribution of the product.

SUMMARY

According to one aspect of this disclosure, a method for preparing a foundry premix composition includes supplying air to a unit containing a clay component and to a unit containing a carbon component via a blower; introducing the clay component and the carbon component into a blending unit, optionally after passing the clay component and the carbon component through a filter; and performing an on-site blending of the clay component and carbon component in the blending unit to obtain the foundry premix composition, which has a bulk density of about 30-45 lbs/ft$^3$.

According to another aspect of this disclosure, the foundry premix composition contains particles having an average particle size of about 85-100 μm.

According to another aspect of this disclosure, the unit containing the clay component and the unit containing a carbon component are connected via conveying lines to a truck with the blower.

According to another aspect of this disclosure, the unit containing the clay component, the unit containing the carbon component, and the blending unit are connected via conveying lines to a flat bed trailer containing the blower, a weight tank, and a powder pump; and before passing the clay component and the carbon component. Optionally, the clay component and the carbon component are fed into the weight tank and then conveyed to the filter via the powder pump.

According to another aspect of this disclosure, the clay component contains a bentonite.

According to another aspect of this disclosure, the bentonite is at least one selected from the group consisting of sodium bentonite, calcium bentonite, potassium bentonite, and aluminum bentonite.

According to another aspect of this disclosure, the clay component contains ball clay.

According to another aspect of this disclosure, the carbon component contains bituminous coal.

According to another aspect of this disclosure, the bituminous coal is sea coal.

According to another aspect of this disclosure, the clay component and the carbon component are blended in the blending unit with at least one other component.

According to another aspect of this disclosure, the at least one other component contains a high aspect ratio silicate having an aspect ratio greater than 10.

According to another aspect of this disclosure, the high aspect ratio silicate is mica.

According to another aspect of this disclosure, the at least one other component contains a recycled sand molding medium.

According to another aspect of this disclosure, the at least one other component contains a liquid.

According to another aspect of this disclosure, the at least one other component is at least one additive selected from the group consisting of a polymer, a surfactant, iron oxide, cellulose, corn cereal, and starch.

According to another aspect of this disclosure, a method of sand casting includes preparing a sand molding medium by mixing the foundry premix composition described in this disclosure with sand and water, and preparing a mold by forming the sand molding medium into a shape.

According to another aspect of this disclosure, a method of molding an article includes introducing a heated material into a mold, which comprises the foundry premix composition described in this disclosure, sand, and water; and cooling the heated material.

According to another aspect of this disclosure, the heated material comprises a molten metal or a molten metal alloy.

DETAILED DESCRIPTION

It is to be understood that the figures and descriptions of the present disclosure have been simplified to illustrate elements that are relevant for a clear understanding of the disclosure, while eliminating other elements that may be well known or understood by those skilled in the art for purposes of clarity.

Throughout this description all ranges described include all values and sub-ranges therein, unless otherwise specified. The terms "approximately" and "about" refer to being nearly the same as a referenced number or value. As used herein, the terms "approximately" and "about" should be understood to encompass ±5% of a specified amount or value.

A foundry premix composition includes a clay component and a carbon component. The clay component serves as a binder and can be a bentonite, a ball clay material, fireclay, and a combination thereof. The bentonite may be chosen from sodium bentonite, calcium bentonite, potassium bentonite, aluminum bentonite, and a combination thereof. Ball clay is largely known as a raw material for ceramics manufacturing due to its white color upon firing and is a sedimentary clay of natural origin that typically comprises about 20%-80% kaolinite, about 10%-25% mica, about 6%-65% quartz, and various other organic and inorganic materials. The carbon component can be leonardite, lignite, causticized lignite, bituminous coal such as sea coal (a finely-ground type of bituminous coal), Flocarb® (a naturally-occurring organic material produced by Amcol), graphite, lustrous carbon formers (e.g., gilsonite, pitch, organic by-products, polymers), petroleum pitch, and a combination thereof. The carbon component can be surface-treated. An exemplary foundry premix composition according to the present disclosure contains a bentonite and sea coal.

The unique foundry premix composition of this disclosure is produced by using specially designed assemblies of mechanical equipment with improved efficiency so that the premix can be prepared at a site closer to a foundry. This way, increase in premix density caused by handling and shipping across a long distance from a traditional premix manufacturing facility to a foundry can be suppressed; transportation cost can be saved; and safety would be of less concern.

The obtained premix composition has a size distribution of improved performance/application in, for example, green sand molding operations in the foundry industry. In addition, the obtained premix composition has finer particles with an average particle size of about 85 µm to about 100 µm and is less dense with a bulk density of approximately 30 lbs/ft$^3$ to approximately 45 lbs/ft$^3$. A less dense premix performs better by allowing a green sand molding medium produced therefrom to have improved green sand properties, including improved green compression strength, green shear strength, and dry compression strength.

Figure 1:
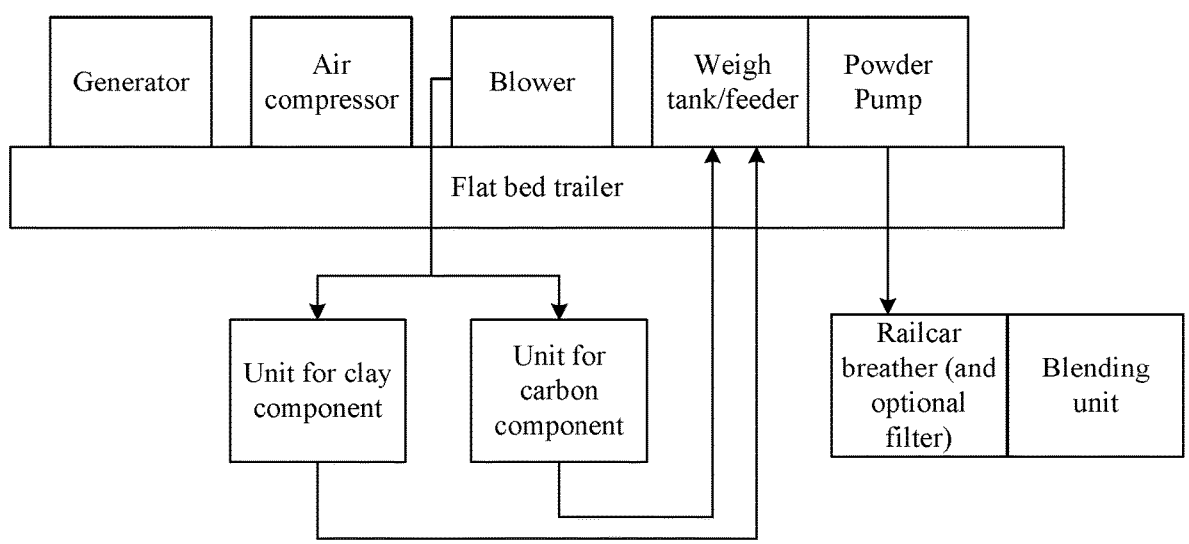
FIG. 1 illustrates an embodiment of an assembly of mechanical equipment design that is used to prepare the unique foundry premix composition.

An assembly of mechanical equipment as illustrated in FIG. 1 includes a flat bed trailer; a unit for clay component; a unit for carbon component; and a blending unit with a railcar breather and optional filter for preparing the premix composition. Therefore, the blending is performed on site so that the premix composition can be prepared closer to a foundry. The flat bed trailer has at least a blower, a weigh tank/feeder, a powder pump, an air compressor, and a generator. The blower is connected to the unit for clay component and the unit for carbon component and blows air into the units so that the particles become "fluffy". Afterwards, the fluffy clay powder and carbon powder are introduced into the weigh tank/feeder and pumped into the blending unit via the railcar breather/filter by the powder pump to prepare the premix composition.

Figure 2:
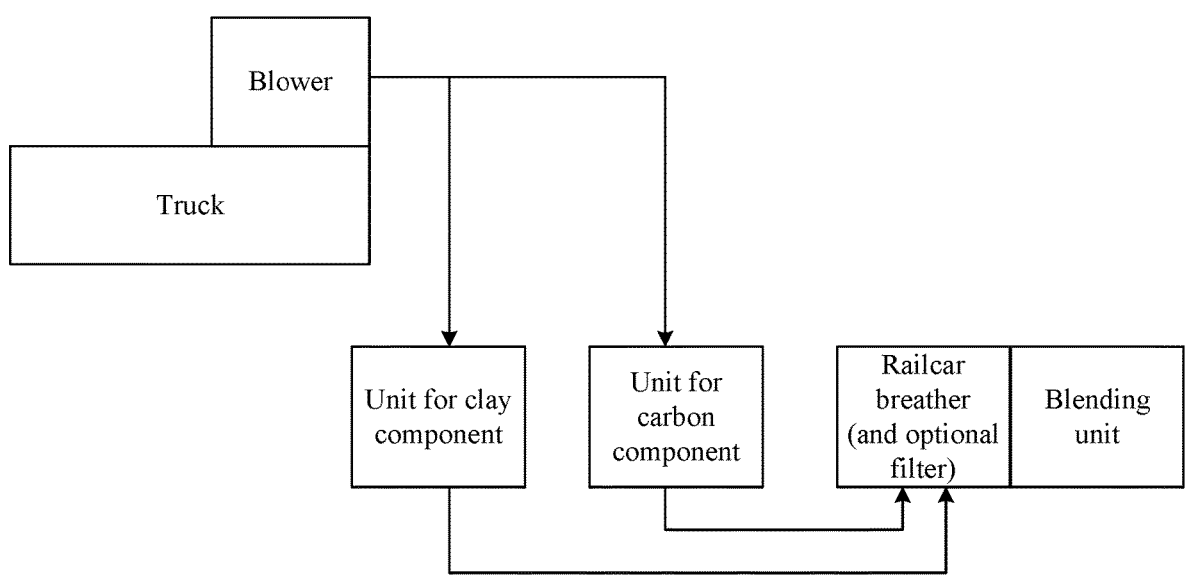
FIG. 2 illustrates another embodiment of an assembly of mechanical equipment design that is used to prepare the unique foundry premix composition.

Another example of the assembly of mechanical equipment is illustrated in FIG. 2. As compared with the assembly of FIG. 1, instead of using a flat bed trailer, a truck having at least a blower is used. Similar to the assembly of FIG. 1, the blower is connected to the unit for clay component and the unit for carbon component and blows air into the units so that the particles become "fluffy". Afterwards, the fluffy clay powder and carbon powder can be directly introduced into the blending unit via the railcar breather/filter to prepare the premix composition. Therefore, similar to the assembly of FIG. 1, the blending is performed on site so that the premix composition can be prepared closer to a foundry.

The clay component and the carbon component can be blended with one or more other materials or additives to prepare the foundry premix composition. Examples of such materials or additives include a liquid, a high aspect ratio silicate, a polymer, a surfactant, iron oxide, cellulose (e.g., ground plant products), corn cereal, starch, and a solid or semisolid recycled sand molding medium.

The addition of liquids can improve the performance of the prepared premix. The high aspect ratio silicate may comprise, for example, mica and/or talc. Exemplary mica minerals include muscovite, paragonite, lepidolite, phlogopite, biotite, and a combination thereof. The high aspect ratio silicate has an aspect ratio greater than 10. For example, the aspect ratio may range from 10, 20, and 40 to 80, 100, and 1000. The high aspect ratio silicates may have a d50 particle diameter of about 50 µm, about 55 µm, about 58 µm, about 60 µm, about 62 µm, about 65 µm, about 68 µm, about 70 µm, about 72 µm, about 75 µm, about 78 µm, or about 80 µm. A solid or semisolid recycled sand molding medium, in which the hydrated bentonite is dehydrated to some extent, can import a unique composition characteristic to the premix.

The equipment design of this disclosure demonstrates that both material composition and sizing distribution together can influence the performance of a foundry premix composition.

The present disclosure further includes methods of sand casting using the foundry premix composition described above or elsewhere herein. For example, the method of sand casting may comprise preparing a sand molding medium by mixing sand and the premix composition with water; and preparing a mold by forming the sand molding medium into a shape.

The present disclosure further includes methods of molding an article. For example, the method may comprise introducing a heated material into a mold, which comprises the foundry premix composition described above or elsewhere herein, sand, and water, and allowing the heated material to cool. The heating material may comprise, for example, a metal or metal alloy.

Examples of sand may include a natural or synthetic sand or sand composite material, such as silica sand ($SiO_2$), chromite sand ($FeCr_2O_4$), and zircon sand ($ZrSiO_4$), any of which optionally may include other elements such as magnesium, aluminum, manganese, and/or carbon (graphite). Other types of sand may be used without departing from the principles of the present disclosure. The composition and gradation of sand may be selected based at least in part on the composition of the material to be cast, the temperature of casting, and/or the availability of sand obtained from a local source.

The foundry premix composition described above or elsewhere herein may be combined with sand and any additives, and moistened with water to produce a green sand molding medium. Moistening the composition with water activates the binding properties of the clay for forming the molding medium into a sand mold. The water may provide for a moisture content of the molding medium ranging from about 1.0%, 1.5%, 1.8%, and 2.0% to about 2.2%, 2.4%, 2.5%, 3.5%, 5.0%, and 7.0% by weight with respect to the total weight of the molding medium.

The green sand molding medium may comprise sand in a weight ratio of from about 75% to about 95%, for example, from about 80% to about 90% by weight, or from about 85% to about 90% sand by weight, with respect to the total weight of the green sand molding medium. Further, the molding medium may comprise from about 5% to about 20% by weight of the clay material (including, for example, ball clay material, bentonite, and/or fireclay), such as from about 8% to about 16%, from about 10% to about 15% by weight, with respect to the total weight of the green sand. In one example, the molding medium comprises from about 80% to about 95% by weight sand (e.g., silica sand), from about 5.0% to about 15.0% by weight bentonite, and from about 0.1% to about 5.0% by weight high aspect ratio silicate, such as mica. In another example, the molding medium comprises from about 90% to about 95% by weight sand (e.g., silica sand), from about 5.0% to about 8.0% by weight bentonite, and from about 1.8% to about 2.2% by weight mica.

Various analyses may be used to characterize a green sand molding medium to assess its capacity to produce casted articles with appropriate characteristics. The characteristics of a green sand molding medium include flowability, permeability, green compression strength, green shear strength, dry compression strength, hot compression strength, friability, and cone jolt toughness.

Permeability may be determined by measuring the flow rate of air passing through a sample under standard pressure. The standard sample size for testing is generally a cylinder having a diameter of 50.8 mm (2 in.) and a height of 50.8 mm (i.e., a cylindrical sample 2 in. by 2 in.), or a cylinder having a diameter of 50 mm and a height of 50 mm. According to some aspects of the present disclosure, permeability may be determined as the time taken by 2000 $cm^3$ of air at a pressure of 980 Pa to pass through the sample. A higher permeability value corresponds to a greater capacity to vent gas as the mold is heated. Green sand molding medium according to the present disclosure may have a permeability ranging from about 105 to about 120, such as from about 108 to about 116, or from about 110 to about 113.

A green sand molding medium containing the premix composition of this disclosure may have a green compression strength ranging from about 5.0 $N/cm^2$ to about 20.0 $N/cm^2$, such as from about 10.0 $N/cm^2$ to about 15.0 $N/cm^2$, or from about 10.5 $N/cm^2$ to about 12.5 $N/cm^2$, and a green shear strength ranging from about 1.0 $N/cm^2$ to about 7.0 $N/cm^2$, such as from about 2.0 $N/cm^2$ to about 5.0 $N/cm^2$, or from about 2.5 $N/cm^2$ to about 3.0 $N/cm^2$. The green sand molding medium may have a dry compression strength ranging from about 30 $N/cm^2$ to about 70 $N/cm^2$, such as from about 40 $N/cm^2$ to about 50 $N/cm^2$, or from about 45 $N/cm^2$ to about 55 $N/cm^2$; and a wet tensile strength ranging from about 0.100 $N/cm^2$ to about 0.600 $N/cm^2$, such as from about 0.150 $N/cm^2$ to about 0.500 $N/cm^2$, from about 0.250 $N/cm^2$ to about 0.350 $N/cm^2$, from about 0.275 $N/cm^2$ to about 0.375 $N/cm^2$, from about 0.300 $N/cm^2$ to about 0.360 $N/cm^2$, or from about 0.325 $N/cm^2$ to about 0.350 $N/cm^2$. In addition, the green sand molding medium disclosed herein may have a hot compression strength measured following American Foundry Society procedures (AFS Mold and Core Test handbook) ranging from about 300 $N/cm^2$ (~435 psi) to about 415 $N/cm^2$ (~600 psi), such as from about 350 $N/cm^2$ (~508 psi) to about 375 $N/cm^2$ (~544), when measured at a temperature between 950° C. and 1100° C.

Friability measures the surface brittleness and abrasion resistance of a green sand molding medium on various surfaces of the sand mold. Higher clay levels generally reduce friability, since loose sand can result in sand inclusion defects on casting surfaces. A molding composition comprises ball clay materials, optionally in combination with bentonite, may provide for green sand molds having lower friability relative to those formed from bentonite clays alone. Friability is generally inversely related to compactability, where a decrease in compactability or brief air-drying period may result in an increase in friability. Green sand molding medium according to the present disclosure may have a friability ranging from about 1% to about 20%, such as from about 3% to about 15%, from about 6% to about 13%, from about 8% to about 12%, or from about 9% to about 11%.

Cone jolt toughness measures the ability of green sand molding medium to absorb energy by repeatedly applying stress to a green sand sample and measuring the point at which the sample splits. Cone jolt toughness generally refers to the integrity of a mold. In a typical test, a green sand sample is automatically picked up and dropped to measure the number of jolts versus displacement of the sample. The test may conclude when the sample splits or measures a vertical displacement of 1.25 mm (0.05 in.). Green sand molding medium according to the present disclosure may have a cone jolt toughness ranging from 10 jolts to 50 jolts, such as 15 jolts to 35 jolts, 20 jolts to 32 jolts, or 23 jolts to 26 jolts. Certain additives incorporated into the green sand molding medium may help to increase the cone jolt toughness of the green sand mold. For example, corn cereal and/or starch may be added to the green sand molding medium such that the cone jolt toughness may be greater than 50 jolts.

Numerous modification and variations on the methods described herein are possible in light of this disclosure. It is to be understood that within the scope of the appended claims, the methods may be practiced otherwise than as specifically described herein.

What is claimed is:

1. A method for preparing a foundry premix composition, the method comprising:
   supplying air to a unit (I) containing a clay component and to a unit (II) containing a carbon component via a blower;
   introducing the clay component and the carbon component into a unit (III); and
   performing an on-site blending of the clay component and carbon component in the unit (III) to obtain the foundry premix composition,
   wherein the foundry premix composition has a bulk density ranging from 30 lbs/ft$^3$ to 45 lbs/ft$^3$.

2. The method of claim 1, wherein the foundry premix composition contains particles having an average particle size ranging from 85 µm to 100 µm.

3. The method of claim 2, wherein the unit (I) and the unit (II) are connected via conveying lines to a truck with the blower.

4. The method of claim 2, wherein:
   the unit (I), the unit (II), and the unit (III) are connected via conveying lines to a flat bed trailer containing the blower, a weight tank, and a powder pump; and
   the clay component and the carbon component are fed into the weight tank and then conveyed to the filter via the powder pump.

5. The method of claim 1, wherein the clay component comprises a bentonite.

6. The method of claim 5, wherein the bentonite is at least one selected from the group consisting of sodium bentonite, calcium bentonite, potassium bentonite, and aluminum bentonite.

7. The method of claim 1, wherein the clay component comprises ball clay.

8. The method of claim 1, wherein the carbon component comprises bituminous coal.

9. The method of claim 8, wherein the bituminous coal is sea coal.

10. The method of claim 1, wherein in the unit (III), the clay component and the carbon component are blended with at least one other component.

11. The method of claim 10, wherein the at least one other component contains a high aspect ratio silicate having an aspect ratio greater than 10.

12. The method of claim 11, wherein the high aspect ratio silicate is mica.

13. The method of claim 10, wherein the at least one other component contains a recycled sand molding medium.

14. The method of claim 10, wherein the at least one other component contains a liquid.

15. The method of claim 10, wherein the at least one other component is at least one additive selected from the group consisting of a polymer, a surfactant, iron oxide, cellulose, corn cereal, and starch.

16. The method of claim 1, further comprising passing the clay component and the carbon component through a filter before introducing the clay component and the carbon component into unit (III).

17. A method of sand casting, the method comprising:
   preparing a foundry premix composition using the method of any of the preceding claims;
   preparing a sand molding medium by mixing the foundry premix composition with sand and water; and
   preparing a mold by forming the sand molding medium into a shape.

18. A method of molding an article, the method comprising:
   preparing a foundry premix composition using the method of claim 1;
   forming a mold from the foundry premix composition, sand, and water;
   introducing a heated material into the mold; and
   cooling the heated material.

19. The method of claim 18, wherein the heated material comprises a molten metal or a molten metal alloy.

* * * * *